United States Patent
Nitta

(10) Patent No.: US 6,181,047 B1
(45) Date of Patent: Jan. 30, 2001

(54) PERMANENT MAGNET MOTOR WITH IMPROVED STATOR CORE AND WASHING MACHINE PROVIDED THEREWITH

(75) Inventor: Isamu Nitta, Yokohama (JP)

(73) Assignee: Kabushiki Kaisha Toshiba, Kawasaki (JP)

( * ) Notice: Under 35 U.S.C. 154(b), the term of this patent shall be extended for 0 days.

(21) Appl. No.: 09/210,945

(22) Filed: Dec. 15, 1998

(30) Foreign Application Priority Data

Dec. 15, 1997 (JP) .................................................... 9-344946

(51) Int. Cl.[7] .............................. H02K 5/24; H02K 1/12; H02K 1/00; H02K 3/00; H02K 1/06
(52) U.S. Cl. ......................... 310/254; 310/51; 310/179; 310/216; 310/193; 310/191; 310/209
(58) Field of Search ................................ 310/254, 179, 310/51, 188, 187, 185, 186, 256, 67 R, 216, 193, 209, 191

(56) References Cited

U.S. PATENT DOCUMENTS

| | | | |
|---|---|---|---|
| 3,860,843 | * | 1/1975 | Kawasaki et al. ............... 310/67 R |
| 4,806,717 | * | 2/1989 | Hershberger ..................... 318/138 |
| 4,847,526 | * | 7/1989 | Takehara et al. ................ 310/185 |
| 5,260,620 | * | 11/1993 | Morrill .............................. 310/185 |
| 5,331,245 | * | 7/1994 | Burgbacher et al. ............. 310/186 |
| 5,778,703 | | 7/1998 | Imai et al. ......................... 68/12.02 |

FOREIGN PATENT DOCUMENTS 2-22069    2/1990   (JP) .

* cited by examiner

*Primary Examiner*—Nestor Ramirez
*Assistant Examiner*—Guillermo Perez
(74) *Attorney, Agent, or Firm*—Pillsbury Madison & Sutro LLP

(57) ABSTRACT

A permanent magnet motor includes a rotor having a permanent magnet and a stator core having circumferential teeth the number of which is 2n where n is an integer equal to or larger than 2, the teeth including first teeth the number of which is n and second teeth the number of which is n, the first and second teeth being circumferentially regularly disposed alternately. Each first tooth has a head with an end face opposed to the rotor and formed generally into the shape of an arc about a center of rotation of the rotor so that an air gap defined between said end face and a surface of the rotor opposed to said end face is circumferentially uniform. Each second tooth has a head with an end face opposed to the rotor and shaped so as to be gradually departed farther away from an opposite surface of the rotor as the head extends from its circumferentially central portion toward both circumferential ends.

11 Claims, 8 Drawing Sheets

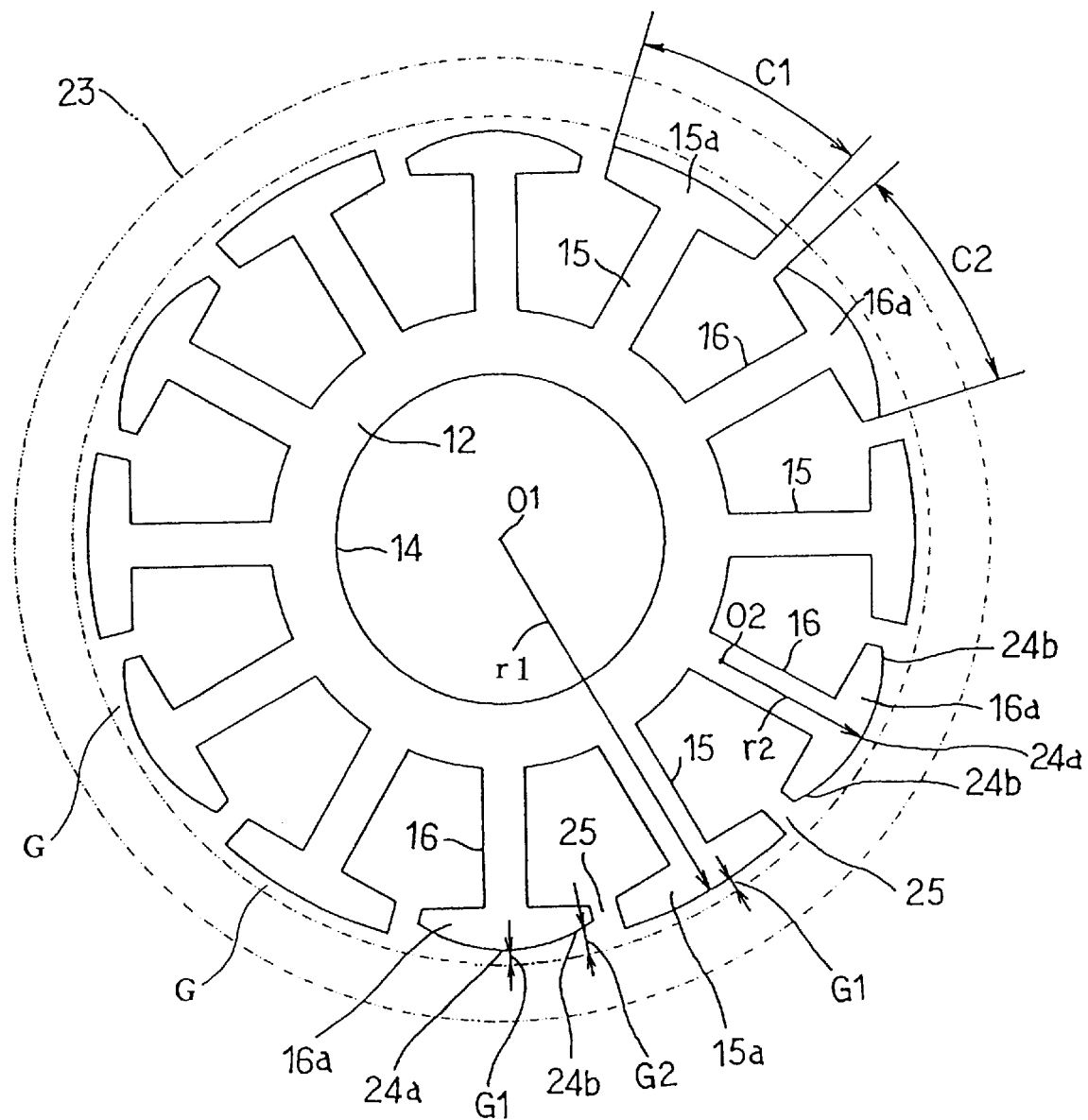
F I G. 1

PERMANENT MAGNET MOTOR WITH IMPROVED STATOR CORE AND WASHING MACHINE PROVIDED THEREWITH

BACKGROUND OF THE INVENTION

1. Field of the invention

This invention relates to a permanent magnet motor including a rotor composed of permanent magnets and a washing machine provided with the permanent magnet motor, and more particularly to such a permanent magnet motor including a stator core improved for the purpose of reducing a cogging torque and such a washing machine in which vibration and noise due to operation thereof is reduced.

2. Description of the prior art

Various configurations of stator cores have conventionally been provided for improving starting characteristics of permanent magnet motors. For example, Japanese Unexamined Utility Model Reg. Publication No. 2-22096 (1990) discloses a brushless motor provided with a stator core having such an improved configuration. FIG. 8 shows the stator core disclosed in the publication. The shown configuration of the stator core reduces a cogging torque as well as simplifies a starting circuit arrangement.

Referring to FIG. 8, an electric motor of the inner rotor type in which a rotor 1 is disposed inside a stator is shown. The rotor 1 includes rotor magnets 2 comprising permanent magnets. The stator includes a stator core 3 having circumferentially alternately arranged first and second teeth 4 and 5. Each first tooth 4 includes a head 4a having an end face opposed to the rotor magnets 2. Each tooth 5 also includes a head 5a having an end face opposed to the rotor magnets 2. The end faces of the heads 4a and 5a are formed into the shape of an arc about a center of rotation of the rotor 1 and have different radii which are distances between the end faces and the center of rotation of the rotor 1. Accordingly, an air gap g1 between the head 4a of each tooth 4 and the rotor magnets 2 differs from an air gap g2 between the head 5a of each tooth 5 and the rotor magnets 2, that is, g1<g2. Armature windings are wound on the first and second teeth 4 and 5.

In the permanent magnet motors, a magnetic energy density in the air gap is higher in the vicinity of the teeth of the stator core and lower in the vicinity of slot openings between adjacent teeth. Furthermore, the magnetic energy density is lower in an area of the air gap located at each boundary between the magnets of different magnetic poles abutting each other than in the other area of the air gap. As a result, when the boundary between the magnets of different magnetic poles passes the opening between the adjacent teeth, portions of low magnetic energy at the rotor side and the stator core side coincides with each other such that the cogging torque shows a peak value. Since the peak of the cogging torque simultaneously occurs at a plurality of openings between the teeth, influences of the cogging torque become conspicuous.

The air gaps g1 and g2 differ from each other in the construction as shown in FIG. 8. As a result, the cogging torque does not take the peak values at all the openings 6 simultaneously and accordingly, the peak value of the cogging torque is decreased. However, each first tooth 4 and each second tooth 5 differ in magnetic resistance from each other since the air gaps g1 and g2 differ from each other. Consequently, the differences in the magnetic resistance vary an electromagnetic force when the armature windings are energized so that the rotor 1 is rotated. This results in vibration and noise in the motor.

SUMMARY OF THE INVENTION

Therefore, an object of the present invention is to provide a permanent magnet motor in which the vibration and noise due to the variations in the electromagnetic force can be restrained as much as possible and a washing machine in which the above motor is used and the vibration and noise produced therein can be reduced.

The present invention provides a permanent magnet motor comprising a rotor having a permanent magnet and a stator core having circumferential teeth the number of which is 2n where n is an integer equal to or larger than 2, the teeth including first teeth the number of which is n and second teeth the number of which is n, the first and second teeth being circumferentially regularly disposed alternately. In this motor, each first tooth has a head with an end face opposed to the rotor and formed generally into the shape of an arc about a center of rotation of the rotor so that an air gap defined between said end face and a surface of the rotor opposed to said end face is circumferentially uniform. Furthermore, each second tooth has a head with an end face opposed to the rotor and shaped so as to be gradually departed farther away from an opposite surface of the rotor as the head extends from a circumferentially central portion thereof toward both circumferential ends thereof.

According to the above-described motor, the air gap between the heads of the first and second teeth and the surface of the rotor takes different values near the circumferential ends of the heads of the respective first and second teeth, that is, near circumferential sides of an opening defined by each first tooth and the adjacent second tooth. This difference in the air gap reduces the peak value of the cogging torque. Furthermore, each second tooth is shaped so as to be gradually departed farther away from the opposite surface of the rotor as the head extends from the circumferentially central portion thereof toward both circumferential ends thereof. This shape of each second tooth decreases a mean air gap between each second tooth and the surface of the rotor to a smaller value. Consequently, the difference in the magnetic resistance can be reduced between the first and second teeth.

In a preferred form, the heads of the first and second teeth have circumferential widths differing from each other. Furthermore, a minimum air gap between the head of each second tooth and the surface of the rotor is set to be equal to or smaller than the air gap between the head of each first tooth and the surface of the rotor.

In another preferred form, a difference between the circumferential widths of the heads of the first and second teeth is substantially the same as a circumferential width of an opening defined between the heads of the first and second teeth adjacent to each other.

The invention also provides a washing machine provided with the above-described permanent magnet motor the rotor of which is substantially directly connected to at least one of a rotatable tub and an agitator.

According to the washing machine, the vibration and noise produced by the motor are at lower levels respectively. Consequently, the outer cabinet of the washing machine can be prevented from resonating to the vibration and noise and producing a large vibration and a loud noise.

BRIEF DESCRIPTION OF THE DRAWINGS

Other objects, features and advantages of the present invention will become clear upon reviewing the description of the preferred embodiments, made with reference to the accompanying drawings, in which:

FIG. 1 is a plan view of the stator core constituting a permanent magnet motor of a first embodiment in accordance with the present invention;

DETAILED DESCRIPTION OF THE PREFERRED EMBODIMENTS

Figure 2:
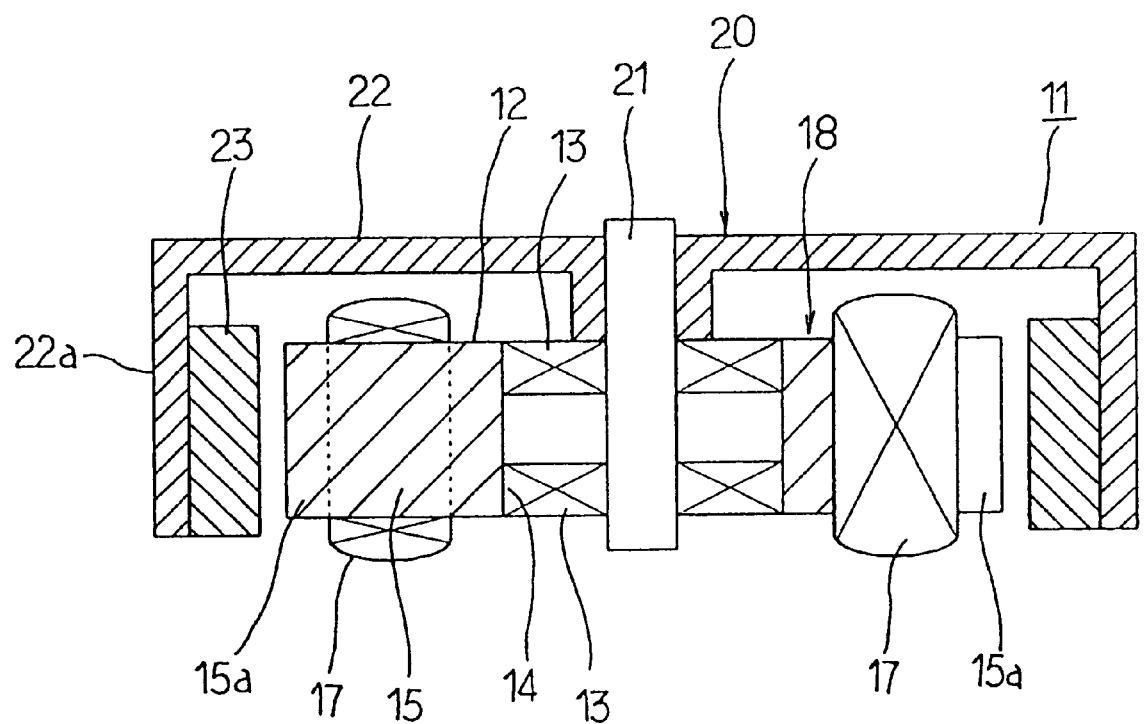
FIG. 2 is a longitudinal section of the motor.

A first embodiment of the present invention will be described with reference to FIGS. 1 and 2. Referring first to FIG. 2, a permanent magnet motor 11 of the outer rotor type in which a rotor is disposed outside a stator is shown. The motor 11 comprises a stator core 12 formed by blanking a number of ring-shaped pieces from a silicon steel plate and stacking the pieces into laminations. The stator core 12 has a centrally formed circular hole 14 into which bearings 13 are fitted. The stator core 12 further includes six first teeth 15 and six second teeth 16 formed on the outer circumference thereof and arranged alternately as shown in FIG. 1.

Armature windings 17 are wound on the first and second teeth 15 and 16 respectively. The first and second teeth 15 and 16 have heads 15a and 16a at distal ends respectively. The heads 15a and 16a of the teeth 15 and 16 protrude radially outward from the respective armature windings 17. The stator core 12 and the armature windings 17 constitute a stator 18 of the motor 11.

A rotor 20 of the motor 11 comprises a shaft 21 rotatably supported on the bearings 13, a rotor yoke 22 secured to an upper end of the shaft 21, and a plurality of rotor magnets 23 fixed on an inner circumferential side of a ring portion 22a which is an outer circumferential portion of the rotor yoke 22. The magnets 23 are arranged into a cylindrical shape. The magnets 23 are radially opposed to end faces of the heads 15a and 16a of the first and second teeth 15 and 16 of the stator core 12 with an air gap G being defined therebetween. The heads 15a and 16a of the teeth 15 and 16 have respective shapes different from each other as shown in FIG. 1. More specifically, the head 15a of each first tooth 15 has an end face opposed to the rotor 20 or more particularly the rotor magnets 23. The end face of the head 15a of each first tooth 15 is formed into the shape of an arc with a radius r1 about the center O1 of rotation of the rotor 20. On the other hand, the head 16a of each second tooth 16 has an end face opposed to the rotor magnets 23 and formed into the shape of an arc with a radius r2 about a point O2 shifted by a predetermined distance from the rotation center O1 of the rotor 20. The radius r2 is set to be smaller than the radius r1. Accordingly, an air gap G1 between the end face of each first tooth head 15a and the rotor magnets 23 is circumferentially uniform. An air gap between a circumferentially central portion 24a of the end face of each second tooth head 16a is the same as the air gap G1. The end face of each second tooth head 16a includes portions extending from the central portion 24a to both ends 24b thereof respectively. These portions of each second tooth head 16a are shaped so as to be continuously departed farther away from the central portion 24a as they extend toward the opposite ends 24b respectively. As a result, the air gap between the end face of each second tooth head 16a and the rotor magnets 23 is gradually increased from the central portion 24a toward the opposite ends 24b. When reference symbol G2 designates an air gap between each end 24b and the rotor magnet 23, the relationship between the air gaps G1 and G2 is expressed as G1<G2. The head 15a of each first tooth 15 has a circumferential width C1 set to be equal to a circumferential width C2 of the head 16a of each second tooth 16 (C1=C2).

According to the above-described embodiment, the air gaps G1 and G2 take different values near the circumferential ends of the heads of the respective first and second teeth 15 and 16 adjacent each other, which ends define each opening 25. Consequently, the cogging torque can be reduced. In other words, a plurality of boundaries between the different poles of the rotor magnets 23 do not simultaneously correspond with only the air gap G1 portions of the first teeth 15 or only the air gap G2 portions of the second teeth 16. Thus, the boundaries are dispersed so as to be located simultaneously at the air gap GI and G2 portions of the first and second teeth 15 and 16. Consequently, the peak value of the cogging torque can be reduced.

Furthermore, the head 16a of each second tooth 16 is shaped so as to be gradually departed farther away from the opposite surface of the rotor magnet 23 as the head extends from the circumferentially central portion thereof toward both circumferential ends thereof. This shape of each second tooth 16 decreases a mean air gap between each second tooth 16 and the surface of the rotor magnet 23 to a smaller value. This reduces the difference in the magnetic resistance between the first and second teeth 15 and 16, and accordingly, a rate of variation in the electromagnetic force. Consequently, vibration and noise induced in the motor can be restrained. The rate of variation in the electromagnetic force can further be reduced particularly since the change in the shape of the end face of the head 16a of each second tooth 16 is not stepwise but continuous.

The air gap G1 between the central portion 24a of the end face of the head 16a of each second tooth 16 and the surface of the rotor magnet 23 is equal to the air gap G1 between the end face of the head 15a of each first tooth 15 and the surface of the rotor magnet 23 in the foregoing embodiment. However, the air gap between the central portion 24a of each second tooth 16 and the surface of the rotor magnets 23 may be set to be slightly smaller than the air gap between the end face of the head 15a of each first tooth 15, instead. In this case, the rate of variation in the circumferential electromagnetic force can further be reduced with respect to the air gap.

Figure 3:
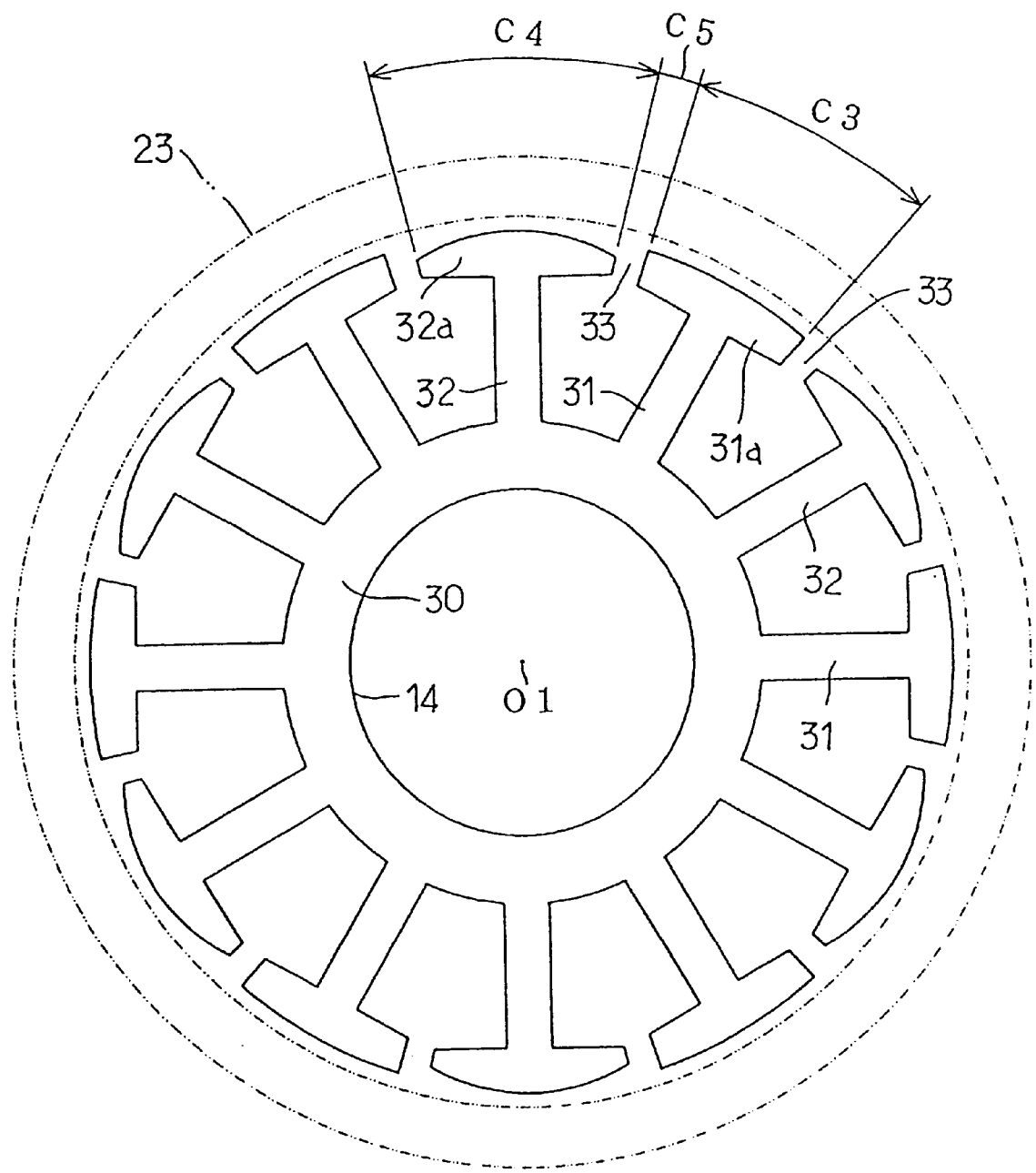
FIG. 3 is a view similar to FIG. 1, showing the permanent magnet motor of a second embodiment in accordance with the invention.

FIG. 3 illustrates a second embodiment of the invention. Only the differences between the first and second embodiments will be described. In a stator core 30, a circumferential width C4 of the head 32a of each second tooth 32 is set to be larger than a circumferential width C3 of the head 31a of each first tooth 31. Moreover, the difference between the circumferential widths C3 and C4 is set to be equal to a circumferential width C5 between the circumferential ends of the heads 31a and 32a of the first and second teeth 31 and 32 adjacent to each other (C4−C3=C5).

The air gap between the circumferentially central portion of the head 32a of each second tooth 32 and the rotor magnets 23 is preferably set to be equal to or slightly smaller than the air gap between the head 31a of each first tooth 31. However, the air gap between the circumferentially central portion of the head 32a of each second tooth 32 and the rotor magnets 23 may be set to be slightly larger than the air gap between the head 31a of each first tooth 31 depending upon the difference between the circumferential widths of the heads 31a and 32a of the first and second teeth 31 and 32.

According to the second embodiment, an interval is provided between the center of each one opening 33 defined by the head 31a or 32a of each one tooth 31 or 32 and the head of one adjacent tooth 32 or 31 and the center of the opening 33 defined by the head 31a or 32a of said each one tooth 31 or 32 and the head of the other adjacent tooth 32 or 31. These intervals take different values circumferentially alternately or take the same value every second opening 33. Consequently, the cogging torque and accordingly the electromagnetic vibration can further be reduced.

Figure 4:
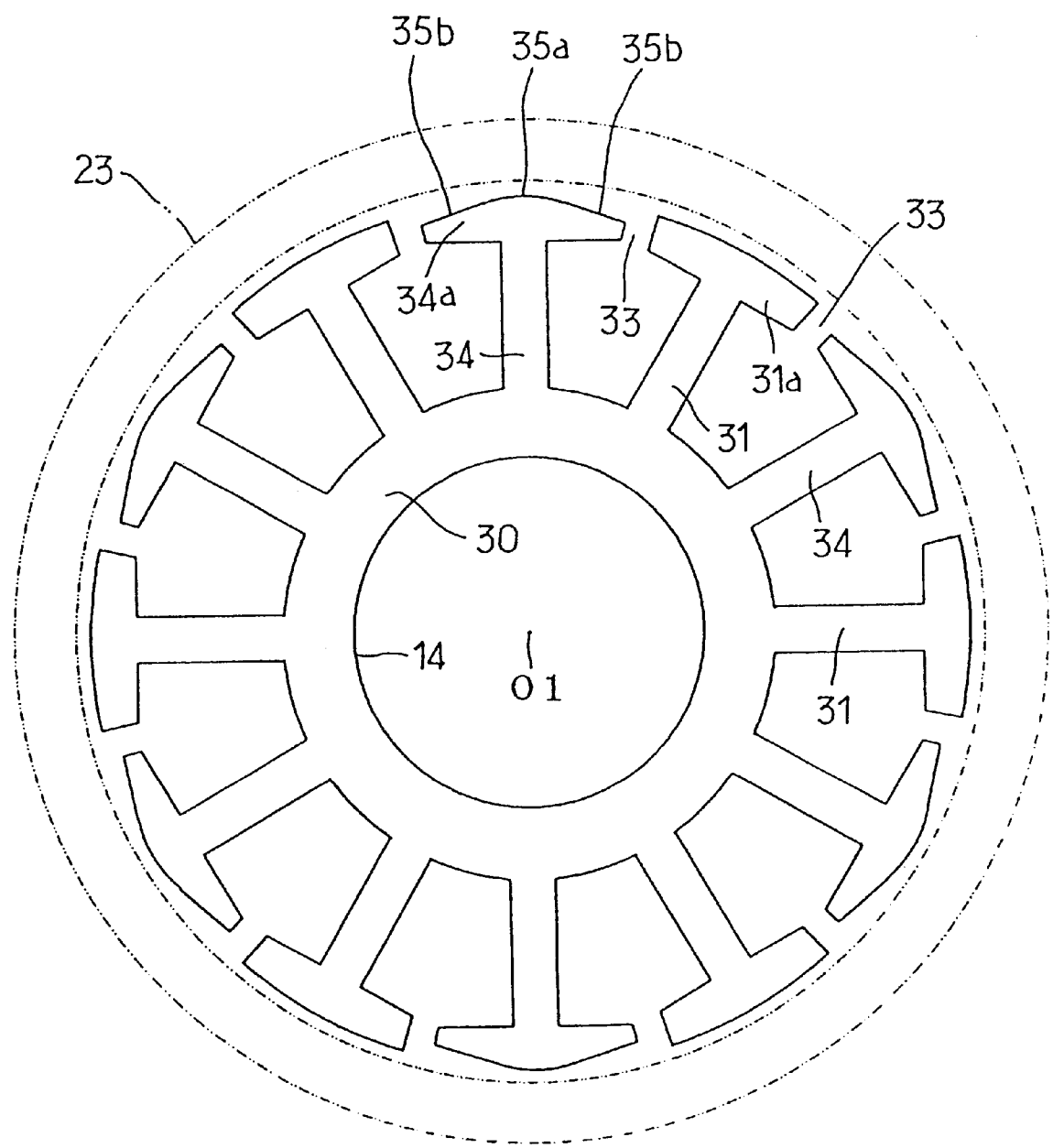
FIG. 4 is a view similar to FIG. 1, showing the permanent magnet motor of a third embodiment in accordance with the invention.

FIG. 4 illustrates a third embodiment of the invention. The third embodiment differs from the second embodiment in the following. The end face of the head 34a of each second tooth 34 has the arc shape at the circumferentially central portion thereof and is slant at both portions extending from the central portion to both ends thereof. The same effect can be achieved from the third embodiment as from the second embodiment.

Figure 5:
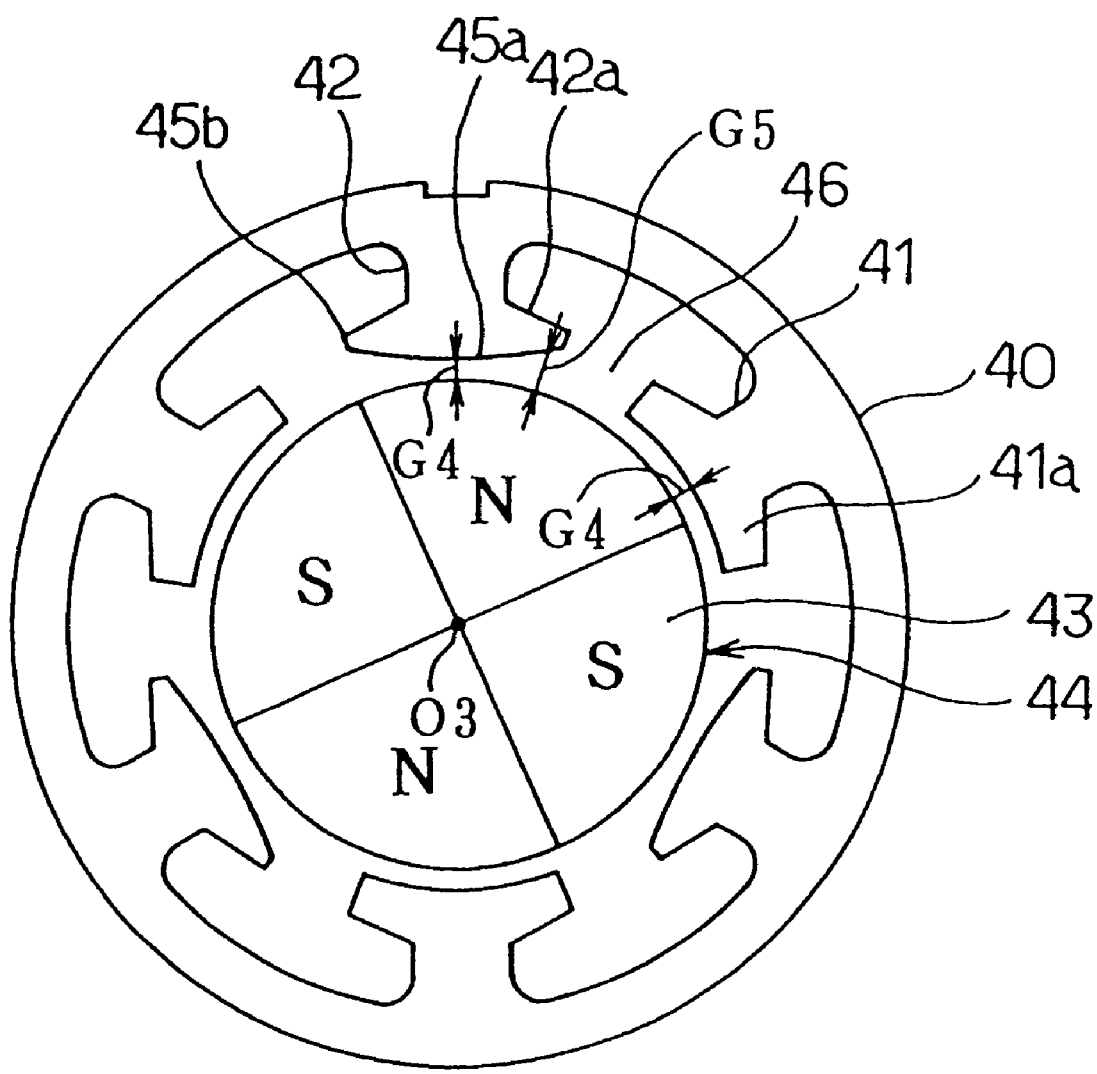
FIG. 5 is a plan view of the stator core and the rotor constituting a permanent magnet motor of a fourth embodiment in accordance with the invention.

FIG. 5 illustrates a fourth embodiment of the invention. The invention has been applied to the permanent magnet motor of the outer rotor type in each of the foregoing embodiments. In the fourth embodiment, however, the invention is applied to a permanent magnet motor of the inner rotor type in which a rotor is disposed inside a stator.

A stator core 40 of the stator includes three first teeth 41 and three second teeth 42 provided at the inner circumferential side. The first and second teeth 41 and 42 are disposed circumferentially alternately. A four-pole rotor 44 including rotor magnets 43 is rotatably provided inside the stator core 40. A head 41a of each first tooth 41 has an end face opposed to the rotor magnets 43. The end face of each head 41a is formed generally into the shape of an arc about a rotation center O3 of the rotor 44. On the other hand, a head 42a of each second tooth 42 has an end face opposed to the rotor magnets 43. The end face of each head 42a is formed generally into the shape of an arc inverse to the end face of each head 41a, that is, each head 42a has an axially convex shape.

Accordingly, an air gap G4 between the end face of each first tooth head 41a and the rotor magnets 43 is circumferentially uniform. An air gap between a circumferentially central portion 45a of the end face of each second tooth head 42a is substantially the same as the air gap G4. The end face of each second tooth head 42a includes portions extending from the central portion 45a to both ends 45b thereof respectively. These portions of each second tooth head 42a are shaped so as to be continuously departed farther away from the rotor magnets 43 as they extend from the central portion 45a toward the opposite ends 45b respectively. As a result, the air gap between the end face of each second tooth head 42a and the rotor magnets 43 is gradually increased from the central portion 45a toward the opposite ends 45b. When reference symbol G5 designates the air gap between each end 45b and the rotor magnet 23, the relationship between the air gaps G4 and G5 is expressed as G4<G5. In other words, an opening 46 is defined between the head 41a of each first tooth 41 and the head 42a of the adjacent second tooth 42. The air gap G4 at one side of the opening 46 is smaller than the air gap G5 at the other side of the opening 46.

According to the construction as described above, the same effect can be achieved from the fourth embodiment as from the first embodiment.

The invention should not be limited to the above-described embodiments. The invention may be modified as follows. The stator core is formed by blanking a number of ring-shaped pieces from a silicon steel plate and stacking the pieces into laminations in the foregoing embodiments. However, a number of band-shaped pieces of the silicon steel plate may be stacked and then bent into the shape of a ring, instead.

In the foregoing embodiments, the circumferential width of the head of each first tooth is equal to or smaller than the circumferential width of the head of each second tooth. The head of each second tooth may have a smaller circumferential width than the head of each first tooth, instead. In this case, however, the air gap between the circumferentially central portion of the head of each second tooth and the rotor magnets needs to be smaller than the air gap between the head of each first tooth and the rotor magnets.

Figure 6:
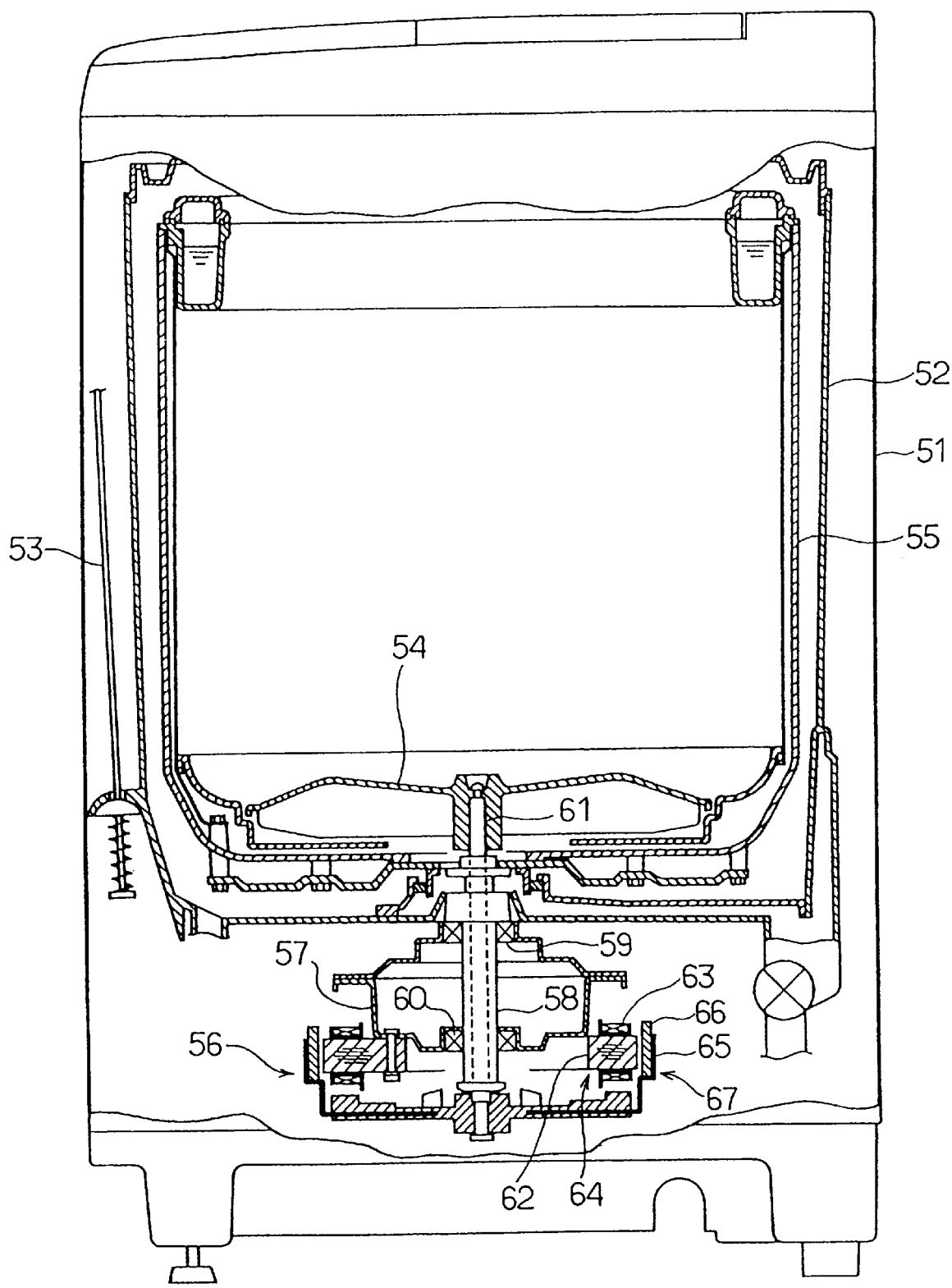
FIG. 6 is a longitudinal section of a clothes washing machine to which the motor in accordance with the invention is applied.
Figure 7:
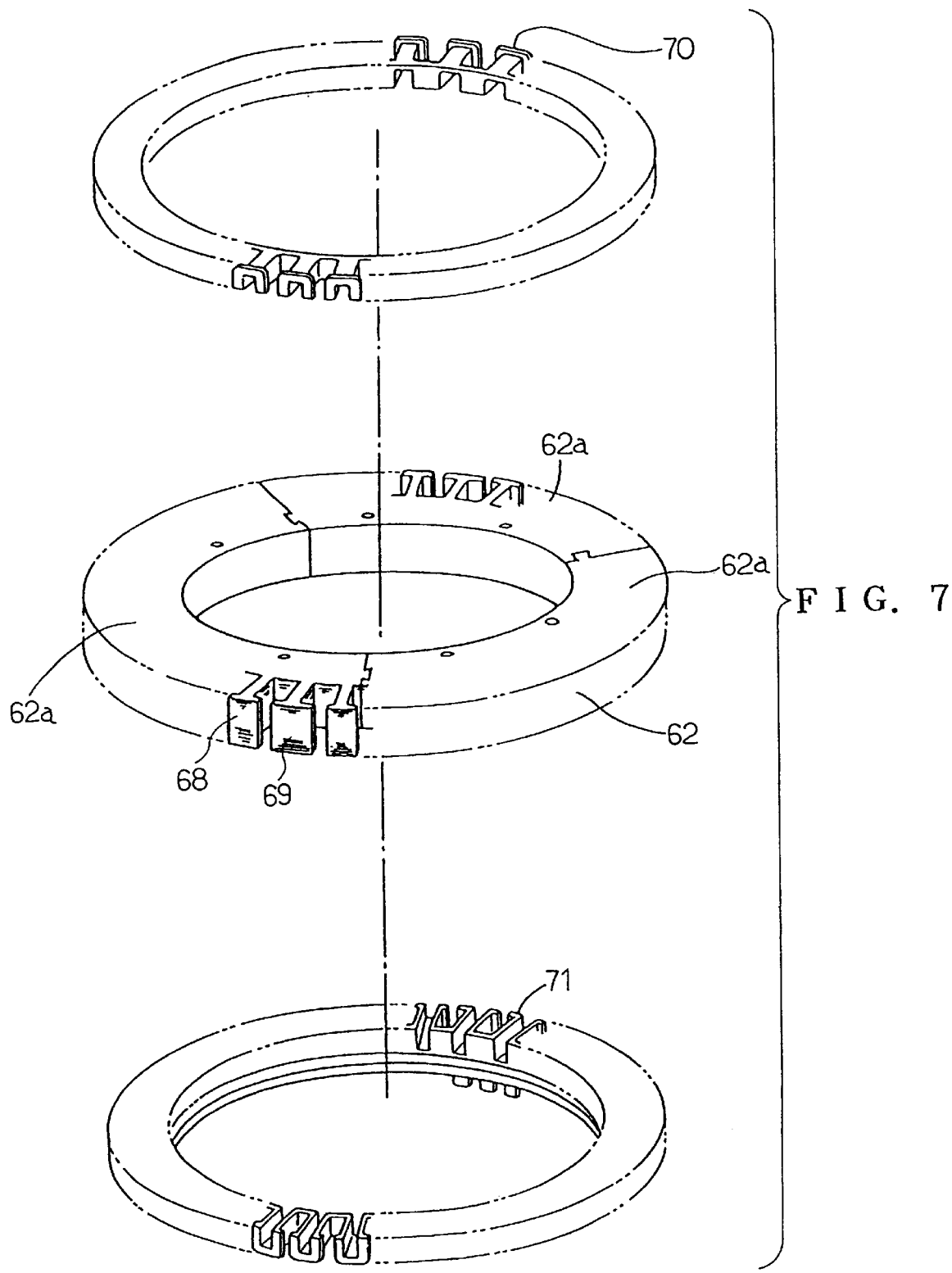
FIG. 7 is an exploded perspective view of the stator core and insulating cover provided in the motor used in the washing machine of FIG. 6.
Figure 8:
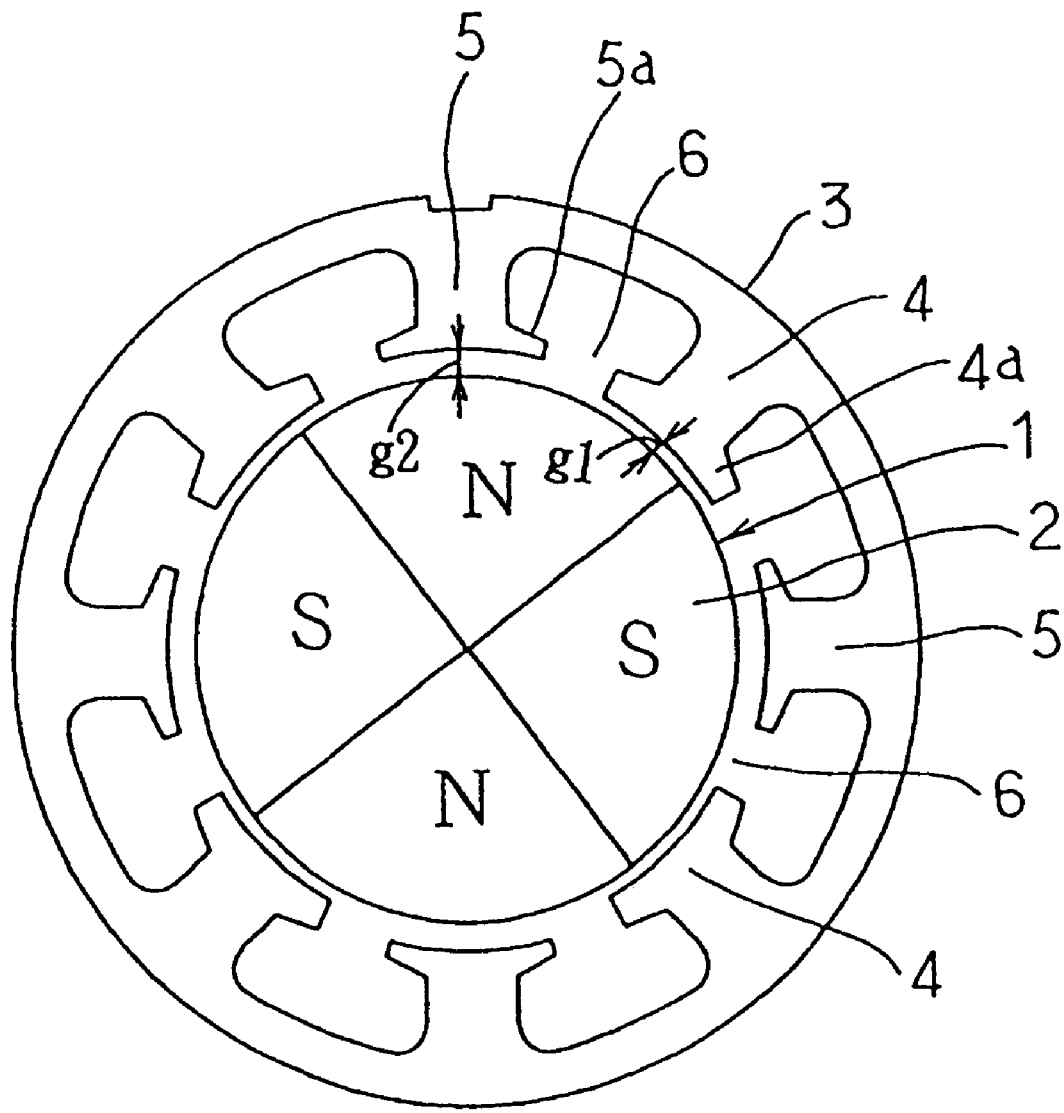
FIG. 8 is a view similar to FIG. 5, showing a prior art.

FIGS. 6 and 7 illustrate a fifth embodiment of the invention. In the fifth embodiment, the permanent magnet motor of the invention is applied to a clothes washing machine. Referring to FIG. 6, the clothes washing machine is shown. The washing machine comprises an outer cabinet 51, a water-receiving tub 52 suspended for rocking motion from suspension rods 53 of elastic suspension mechanisms one of which is shown. A rotatable tub 55 serving both as a wash tub and as a dehydration tub is provided in the water-receiving tub 52. An agitator 54 is rotatably mounted on the bottom of the rotatable tub 55. A washing machine motor 56 including a housing 57 is provided under the water-receiving tub 52 for driving the agitator 54 and the rotatable tub 55.

The rotatable tub 55 is connected to a hollow tub shaft 58 rotatably supported on bearings 59 and 60 provided in the housing 57. The agitator 54 is connected to an agitator shaft 61 inserted through the hollow tub shaft 58 so as to be rotatably supported.

The motor 56 comprises a permanent magnet motor of the outer rotor type, namely, a brushless motor. The motor 56 has the same constitution as shown in FIG. 2. More specifically, the motor 56 comprises a stator 64 including a stator core 62 and stator windings 63, and a rotor 67 including a yoke 65 and permanent magnets 66 attached to the inner circumferential side of the yoke 65. The rotor 67 is disposed outside the stator 64. The stator core 62 is fixed to the housing 57, and the rotor 67 is directly connected to the agitator shaft 61. A clutch (not shown) is provided between the rotor 67 and the tub shaft 58. The clutch connects the tub shaft 58 to the rotor 67 in a dehydrating operation so that the rotatable tub 55 is rotated together with the agitator 54. On the other hand, the clutch disconnects the tub shaft 58 from the rotor 67 in a washing operation so that drive of the rotatable tub 55 is prevented. In this case, the tub shaft 58 is connected to the housing 58 so that the rotatable tub 55 is not rotated with rotation of the agitator 54.

Referring to FIG. 7, the stator core 62 of the brushless motor 56 comprises three split cores 62a. Each split core 62a has three first teeth 68 and three second teeth 69. These teeth 68 and 69 are formed into the same shapes as the first and second teeth 31 and 32 of the stator core 30 shown in FIG. 3 respectively. Two insulating covers 70 and 71 cover the stator core 62. Each cover has the same external shape as that obtained by dividing the stator core 62 into two equal parts. The stator windings 63 are wound on the insulating covers 70 and 71. The above-described driving mechanism including the motor 56 as shown in FIG. 6 is the same as disclosed in U.S. Pat. No. 5,778,703 assigned to the same assignee as of the present application and incorporated herein by reference.

The foregoing description and drawings are merely illustrative of the principles of the present invention and are not to be construed in a limiting sense. Various changes and modifications will become apparent to those of ordinary skill in the art. All such changes and modifications are seen to fall within the scope of the present invention as defined by the appended claims.

I claim:

1. A permanent magnet motor comprising:

a rotor having a permanent magnet; and a stator core having circumferential teeth the number of which is 2n where n is an integer equal to or larger than 2, the teeth including first teeth the number of which is n and second teeth the number of which is n, the first and second teeth being circumferentially regularly disposed alternately;

wherein each first tooth has a head with an end face opposed to the rotor and formed generally into the shape of an arc about a center of rotation of the rotor so that an air gap defined between said end face and a surface of the rotor opposed to said end face is circumferentially uniform; and wherein each second tooth has a head with an end face opposed to the rotor and shaped so as to be gradually departed farther away from an opposite surface of the rotor as the head extends from a circumferentially central portion thereof toward both circumferential ends thereof.

2. A motor according to claim 1, wherein the head of each first tooth has a circumferential width differing from a circumferential width of the head of each second tooth.

3. A motor according to claim 2, wherein a difference between the circumferential widths of the heads of the first and second teeth is substantially the same as a circumferential width of an opening defined between the heads of the first and second teeth adjacent to each other.

4. A motor according to claim 3, wherein the end face of the head of each second tooth has the shape of an arc at a circumferentially central portion of the head and is slant in shape at portions extending from the central portion to both ends of the head respectively.

5. A motor according to claim 2, wherein the circumferential width of the head of each second tooth is equal to or larger than the circumferential width of the head of each first tooth, and an air gap between the circumferentially central portion of the head of each second tooth and the opposite surface of the rotor is equal to or smaller than an air gap between the end face of the head of each first tooth and the opposite surface of the rotor.

6. A motor according to claim 5, wherein the end face of the head of each second tooth has the shape of an arc at a circumferentially central portion of the head and is slant in shape at portions extending from the central portion to both ends of the head respectively.

7. A motor according to claim 2, wherein the circumferential width of the head of each second tooth is set to be smaller than the circumferential width of the head of each first tooth, and an air gap between the circumferentially central portion of the head of each second tooth and the opposite surface of the rotor is smaller than an air gap between the end face of the head of each first tooth and the opposite surface of the rotor.

8. A motor according to claim 7, wherein the end face of the head of each second tooth has the shape of an arc at a circumferentially central portion of the head and is slant in shape at portions extending from the central portion to both ends of the head respectively.

9. A motor according to claim 2, wherein the end face of the head of each second tooth has the shape of an arc at a circumferentially central portion of the head and is slant in shape at portions extending from the central portion to both ends of the head respectively.

10. A motor according to claim 1, wherein the end face of the head of each second tooth has the shape of an arc at a circumferentially central portion of the head and is slant in shape at portions extending from the central portion to the ends of the head respectively.

11. A washing machine comprising:

an outer cabinet;

a rotatable tub rotatably provided in the outer cabinet;

an agitator rotatbly provided in the rotatable tub;

a permanent magnet motor comprising:

a rotor having a permanent magnet; and a stator core having circumferential teeth the number of which is 2n where n is an integer equal to or larger than 2, the teeth including first teeth the number of which is n and second teeth the number of which is n, the first and second teeth being circumferentially regularly disposed alternately;

wherein each first tooth has a head with an end face opposed to the rotor and formed generally into the shape of an arc about a center of rotation of the rotor so that an air gap defined between said end face and a surface of the rotor opposed to said end face is circumferentially uniform;

wherein each second tooth has a head with an end face opposed to the rotor and shaped so as to be gradually departed farther away from an opposite surface of the rotor as the head extends from a circumferentially central portion thereof toward both circumferential ends thereof; and wherein the rotor of the motor is substantially directly connected to at least one of the rotatable tub and the agitator.

* * * * *